March 18, 1958  W. R. H. BREUER  2,827,376
FISHING BAITS
Filed April 28, 1955
Fig. 1.
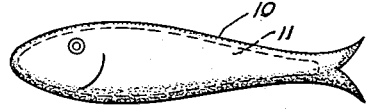
Fig. 2.
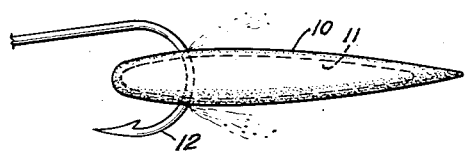
Fig. 3.       Fig. 4.
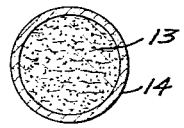   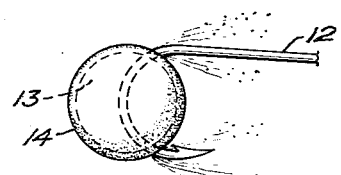
Fig. 5.       Fig. 6.
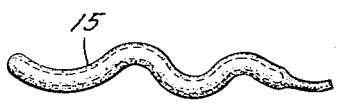   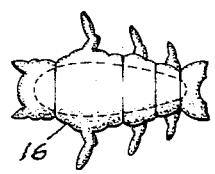
INVENTOR
WILLIAM R. H. BREUER.
BY
Van Deventer & Shively
ATTORNEYS.

United States Patent Office 2,827,376
Patented Mar. 18, 1958

2,827,376
FISHING BAITS
William R. H. Breuer, St. Albans, N. Y.
Application April 28, 1955, Serial No. 504,602
3 Claims. (Cl. 99—3)

The present invention pertains to improvements in fishing baits.

An object of the invention is to provide a combined edible bait and chum comprising a luring mixture or chum, for example menhaden (mossbunker) oil and breadcrumbs, encapsulated with soft gelatin or gelatinoid to form a single unit adapted to establish a practical local relationship between the visual lure and the chum.

A further object is to provide baits of the above nature which may be fashioned both in shape and color to simulate natural baits such as minnows, fish eggs, worms, bugs and the like.

A further object is to provide a bait of the above nature adapted to permit the gradual release of its interior contents or chum through openings created by attachment to a hook and/or through additional punctures if desired.

A further object is to provide a completely edible bait of the above nature which in dry condition will keep indefinitely but when placed in water will assume the condition of surface slime common to natural baits.

Further objects and advantages of the invention will become evident during the course of the following description in connection with the accompanying drawings, in which Figure 1 is an exterior side view of the improved bait in a form simulating a small fish or minnow;

Figure 2 is a top view illustrating the same attached to a hook;

Figure 3 is a cross sectional view of a globular embodiment simulating a fish egg;

Figure 4 illustrates the same impaled on a hook so as to release the chum;

Figures 5 and 6 show other forms representing worms and bugs respectively.

Chumming is a method of attracting fish to a baited hook. Menhaden, or other bait fish, are ground into an oily mass called chum. The chum is dribbled into the water to form a slick or "chum line" which attracts the top feeding fish. To attract the bottom feeders the chum is placed in a porous receptacle termed a chum pot. The chum pot is lowered to the bottom of the water, whereupon the oil and particles seep out and attract the fish.

Both the above operations are disagreeable for the angler to perform, particularly because chum mixture is by no means savory except to the fish. Furthermore there is normally no direct relationship between the baited hook and the chum line in the practice described. In the surface operation the chum may drift to an area completely removed from the baited hook, while similarly in bottom fishing the baited hook may be carried away from the vicinity of the chumpot. In either case, chumming is obviously a hit-or-miss proposition.

The present invention provides a direct continuous relationship between the baited hook and the chum line either in surface or bottom fishing, in the following manner:

Referring to typical Figure 1, the numeral 10 indicates a hollow shell of edible sealing material, preferably soft gelatin or similar substance in which is encapsulated a core 11 of any suitable chum such as the menhaden oil and bread crumb mixture previously mentioned. The shell, which simulates the natural bait, normally seals the chum mixture against escape or decomposition due to contact with the air, and since the gelatin itself is stable in air, the artificial baits may be stored indefinitely after the manner of medicine capsules, and may be handled, carried in pockets, etc., without any unpleasantness arising due to the presence of the chum.

When the bait is to be used, it is placed on the hook 12, Figure 2, in the same manner as a natural minnow, though with less difficulty, and is cast into the water. Thereupon two effects take place. The punctures caused by the hook 12, being larger than the hook wire due to the passage of the barb, allow the oily chum to seep out and form a chum line to attract fish directly to the bait. At the same time the water softens the gelatin skin and causes it to acquire a surface closely simulating the natural slime or bloom on a real fish or other water denizen. The swelling of the gelatin also increases the size of the hook punctures, facilitating the gradual release of the chum. If a heavier concentration of chum is desired, additional openings may be made with the point of a hook.

The above-described action of the water on the gelatin casing is of great importance to the effectiveness of the lure. This will be evident when it is considered in artificial lure fishing that any inedible materials such as metal, plastic, rubber or fabric, when encountered by a striking fish, destroy the deception with the result that the fish tends to eject the lure from its mouth. On the other hand, the present improved lure being soft, natural as to surface, and entirely edible with accompanying natural taste, is readily accepted by the fish.

In still fishing, as a further example, the fish usually first tests a bait by nibbling at it. If in testing a bait in this manner the fish finds it to be an inedible substance such as a metal, plastic, rubber or fabric lure, the fish normally will leave it. Since the bait of the present invention is entirely edible, and since its visual attractiveness is augmented by its natural taste, its softness and its slimy surface simulating the slime or bloom of a real fish or the like, the nibbling fish freely accepts it as natural food.

Figures 3 and 4 illustrate the invention applied to a simulated fish egg, Figure 3 being a cross section showing the chum core 13 tightly enclosed in the soft gelatin casing 14, while Figure 4 shows the escape of the chum from the lure impaled on the hook 12 in the same manner as explained respecting Figure 2. Figures 5 and 6 typically show the same combinational structure as applied to simulated worms 15 and bugs 16, these examples illustrating the fact that the invention may be embodied in any practical forms desired for particular types of fishing. In addition to natural bait shapes, it obviously may be made to simulate various prepared baits such as pork rind strips and the like. In any desired case the material of the sheath may be provided with an appropriate color.

While the chum used in the described combination obviously may be of various suitable compositions, the previously mentioned mixture of menhaden oil and ground bread crumbs is preferred for several reasons. The excellence of menhaden oil as a fish attractor is well known. The bread crumbs perform a dual function. The particles which ooze out act as chum while the remainder, retained by the soft gelatin casing, remains as bait and preserves the bulk and body of the lure. At the same time, the bread acts as a semi-retainer for the oil, preventing the latter from dissipating itself too rapidly in the water, and also preventing the possible escape of oil to the angler's hands as the hook is inserted.

Similarly, the advantages in the present invention of the use of soft gelatin, of the type used in the manufacture of soft medicine capsules, may be briefly summarized as follows:

(a) It is edible.
(b) It can be fashioned to almost any shape.
(c) It will not crack as will hard gelatin.
(d) It is easily attached to a hook.
(e) It will take all colors and will hold them fast.
(f) It softens and swells on contact with cold water but will not dissolve therein. It also possesses the unique quality of developing on contact with water the slimy or slippery feel which simulates the slime or bloom of a fish. The appeal to fish of the combination of softness plus slime has already been pointed out at length.
(g) It is not affected by fixed or volatile oils, thus being an ideal substance for encapsulating the chum. Formed in a tight casing, it prevents bacterial decomposition of the chum mixture.
(h) It is clean to handle, without muss or odor.
(i) It is itself resistant to decomposition while dry.

From the foregoing description it will be evident that the present invention comprises an artificial lure which in its normal or dry state is odorless, readily stored and handled, and more easily and sanitarily placed in operation than any natural bait or prior chumming combination, but which when placed in water assumes substantially all the fish-attracting characteristics of natural baits plus the added attraction of chum emission. While the product has been described in preferred form it is not limited to the precise embodiments set forth, as obviously various modifications may be made without departing from the scope of the appended claims.

I claim:

1. An artificial bait comprising, in combination, a soft gelatin casing formed to simulate a natural bait and having a normally dry exterior surface, and a chum mixture of fish-attracting fluid and granular edible material enclosed in said casing in normally air-tight relation but adapted to flow outward therefrom when said casing is punctured.

2. The combination claimed in claim 1 wherein said mixture comprises fish oil and bread crumbs.

3. An artificial fishing bait comprising, in combination, a normally air-tight and exteriorly dry sealing casing of a totally edible soft gelatinous material stable in air and adapted to soften in contact with cold water while acquiring a slimy surface simulating the bloom of a natural bait, and a volume of semi-fluid fish-attracting chum comprising fish-oil with edible crumbs suspended therein normally enclosed in said casing but adapted to exude from said casing when said casing is punctured.

References Cited in the file of this patent
UNITED STATES PATENTS

| | | |
|---|---|---|
| 871,935 | Henzel | Nov. 26, 1907 |
| 1,010,481 | Crane et al. | Dec. 5, 1911 |
| 1,291,614 | Noxon | Jan. 14, 1919 |
| 1,914,351 | Hall et al. | June 13, 1933 |
| 1,922,841 | Cooley | Aug. 15, 1933 |
| 2,218,592 | Taylor | Oct. 22, 1940 |
| 2,555,088 | Irwin | May 29, 1951 |